United States Patent
Hori

(10) Patent No.: US 10,355,287 B2
(45) Date of Patent: Jul. 16, 2019

(54) POROUS LAYER AND MANUFACTURING METHOD OF THE SAME

(71) Applicant: TOYOTA JIDOSHA KABUSHIKI KAISHA, Toyota-shi, Aichi-ken (JP)

(72) Inventor: Yoshihiro Hori, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/780,565

(22) PCT Filed: Nov. 29, 2013

(86) PCT No.: PCT/JP2013/007021
§ 371 (c)(1),
(2) Date: Sep. 28, 2015

(87) PCT Pub. No.: WO2014/167612
PCT Pub. Date: Oct. 16, 2014

(65) Prior Publication Data
US 2016/0056480 A1    Feb. 25, 2016

(30) Foreign Application Priority Data
Apr. 10, 2013  (JP) .................. 2013-081786

(51) Int. Cl.
*H01M 8/00*    (2016.01)
*H01M 8/0239*  (2016.01)
(Continued)

(52) U.S. Cl.
CPC ....... *H01M 8/0239* (2013.01); *H01M 8/0234* (2013.01); *H01M 8/0243* (2013.01);
(Continued)

(58) Field of Classification Search
CPC ............. H01M 8/0239; H01M 8/0243; H01M 8/0234; H01M 8/1004; H01M 4/8807; H01M 4/8828
See application file for complete search history.

(56) References Cited

U.S. PATENT DOCUMENTS 6,428,722 B1 *   8/2002  Furuya ................. C25B 11/035
                                                  252/510
2003/0064279 A1 * 4/2003  Yoshida ............. H01M 4/8605
                                                  429/481

(Continued)

FOREIGN PATENT DOCUMENTS

CA    2 891 105 A1   5/2014
CN    1288490 A      3/2001
(Continued)

*Primary Examiner* — Nicholas P D'Aniello
(74) *Attorney, Agent, or Firm* — Finnegan, Henderson, Farabow, Garrett & Dunner, LLP

(57) ABSTRACT

A manufacturing method of porous layer comprises: drying a mixed solution containing conductive carbon powder and water-repellent resin powder by a spray-drying method, so as to produce a powdery substance including the conductive carbon powder coated with the water-repellent resin powder; and producing the porous layer from the powdery substance. Water-vapor permeability of the porous layer measured in conformity with the Japanese Industrial Standard ES-Z-0208 is 10000 to 25000 g/m²·24 h under conditions of temperature of 40° C. and relative humidity of 90% RH.

3 Claims, 5 Drawing Sheets

(51) Int. Cl.
  *H01M 8/1004* (2016.01)
  *H01M 8/0234* (2016.01)
  *H01M 8/0243* (2016.01)
  *H01M 8/1018* (2016.01)
  *H01M 4/88* (2006.01)

(52) U.S. Cl.
  CPC ........ *H01M 8/1004* (2013.01); *H01M 4/8807* (2013.01); *H01M 4/8828* (2013.01); *H01M 2008/1095* (2013.01); *Y02P 70/56* (2015.11)

(56) References Cited

U.S. PATENT DOCUMENTS

| | | | | |
|---|---|---|---|---|
| 2006/0204833 A1* | 9/2006 | Nomi | .................. | H01M 4/8605 |
| | | | | 429/413 |
| 2011/0123902 A1 | 5/2011 | Zhang et al. | | |
| 2012/0009503 A1* | 1/2012 | Haug | .................. | H01M 4/8668 |
| | | | | 429/523 |

FOREIGN PATENT DOCUMENTS

| | | | |
|---|---|---|---|
| CN | 1411089 | A | 4/2003 |
| JP | 2003-173788 | | 6/2003 |
| JP | 2006-252948 | | 9/2006 |
| JP | 2011-76848 | | 4/2011 |
| JP | 2011-150893 | | 8/2011 |
| JP | 2014-102933 | | 6/2014 |
| KR | 10-2003-0027802 | A | 4/2003 |

* cited by examiner

Fig.7

|  | THICKNESS (μm) | VOLTAGE (mV) AT BATTERY TEMP 80°C | VOLTAGE (mV) AT BATTERY TEMP 50°C | WATER-VAPOR PERMEABILITY (g/m²·24h) | EVALUATION |
|---|---|---|---|---|---|
| SAMPLE A1 | 20 | <u>580</u> | 585 | 28000 | × |
| SAMPLE A2 | 50 | 670 | 580 | 24000 | ◎ |
| SAMPLE A3 | 80 | 680 | 580 | 20000 | ◎ |
| SAMPLE A4 | 100 | 660 | 570 | 18000 | ◎ |
| SAMPLE A5 | 150 | 650 | 560 | 12000 | ◎ |
| SAMPLE A6 | 320 | <u>590</u> | 350 | 9000 | × |
| SAMPLE B | 80 | 650 | 550 | 15000 | ○ |
| SAMPLE C | 80 | 650 | 500 | 17000 | ○ |
| SAMPLE D | 50 | 630 | 320 | — | — |

POROUS LAYER AND MANUFACTURING METHOD OF THE SAME

CROSS-REFERENCE TO RELATED APPLICATIONS

This application is a national phase application of International Application No. PCT/JP2013/007021, filed Nov. 29, 2013, and claims the priority of Japanese Application No. 2013-081786, filed Apr. 10, 2013, the content of both of which is incorporated herein by reference.

TECHNICAL FIELD

The present invention relates to a porous layer and a manufacturing method of the same.

BACKGROUND ART

In a known structure of a membrane electrode assembly (MEA) used for a polymer electrolyte fuel cell, a porous layer is stacked between a catalyst layer and a gas diffusion layer (see, for example, Patent Literatures 1 and 2). The porous layer used in this structure is a layer comprised of continuous micropores and is also called a microporous layer (MPL).

Patent Literature 1 describes producing a porous layer by applying a paste containing conductive carbon powder, metal fiber and a non-polymer fluorine material on a catalyst layer or a gas diffusion layer.

Patent Literature 2 describes producing a porous layer from a mixture of conductive carbon powder and polytetrafluoroethylene (PTFE) powder. Patent Literature 2 also describes producing a porous layer from coprecipitate that is obtained from a mixed solution containing conductive carbon powder and PTFE powder.

CITATION LIST

Patent Literature

PTL 1: JP 2011-76848A
PTL 2: JP 2006-252948A

SUMMARY

Technical Problem

The porous layer of Patent Literature 1 has a problem that the moisture is excessively removed from an electrolyte membrane (so-called dry-up state) in the case that the fuel cell has a relatively high amount of power generation. The dry-up state causes deterioration of the electrolyte membrane and thereby leads to deterioration of the power generation performance of the fuel cell.

In the porous layer produced from the mixture in Patent Literature 2, the PTFE powder has a significantly larger average particle size than the average particle size of the conductive carbon powder. This causes a difficulty in homogeneously dispersing the PTFE powder and the conductive carbon powder in the mixture and thereby leads to a problem of insufficient homogeneity of the porous layer. In the porous layer produced from the coprecipitate in Patent Literature 2, the homogeneity of the PTFE powder in the mixed solution is reduced with elapse of time. This causes a difference in composition between the coprecipitate settling earlier and the coprecipitate settling later and thereby leads to a problem of insufficient homogeneity of the porous layer. The porous layer of the insufficient homogeneity leads to a variation in power generation at the MEA and accordingly causes deterioration of the power generation performance of the fuel cell.

Additionally, the porous layer produced from the coprecipitate in Patent Literature 2 requires a relatively long time for sedimentation and drying of the coprecipitate and accordingly has a problem of low productivity.

There is accordingly a need for a porous layer that allows for improvement of the power generation performance of a resulting fuel cell. With regard to the porous layer, other needs include cost reduction, resource saving, easy manufacture, improvement in convenience and improvement in durability.

Solution to Problem

In order to solve at least part of the problems described above, the invention may be implemented by the following aspects.

(1) According to one aspect of the invention, there is provided a manufacturing method of porous layer that produces a porous layer stacked between a catalyst layer and a gas diffusion layer in a membrane electrode assembly of a fuel cell. The manufacturing method may comprise (a) process of drying a mixed solution containing conductive carbon powder and water-repellent resin powder by a spray-drying method, so as to produce a powdery substance including the conductive carbon powder coated with the water-repellent resin powder; and (b) process of producing the porous layer from the powdery substance produced by the process (a), such that water-vapor permeability of the porous layer measured in conformity with the Japanese Industrial Standard JIS-Z-0208 is 10000 to 25000 g/m²·24 h under conditions of temperature of 40° C. and relative humidity of 90% RH. The manufacturing method of this aspect enables the water-repellent resin powder and the conductive carbon powder to be homogeneously dispersed in the powdery substance, thus enhancing the homogeneity of the porous layer. This results in providing a porous layer that allows for improvement of the power generation performance of the resulting fuel cell. Compared with the method of producing a porous layer from a coprecipitate, this manufacturing method obtains the powdery substance in which the water-repellent resin powder and the conductive carbon powder are dispersed homogeneously, in a shorter time. This results in enhancing the productivity of the porous layer.

(2) In the manufacturing method of the above aspect, the process (b) may produce the porous layer having thickness of 50 to 150 μm from the powdery substance produced by the process (a). According to this aspect, controlling the thickness of the porous layer facilitates production of the porous layer satisfying the water-vapor permeability described above.

(3) In the manufacturing method of the above aspect, the process (b) may include a process of preparing a paste from the powdery substance produced by the process (a); a process of molding the paste to a thin plate-like sheet; and a process of firing the sheet to produce the porous layer. This aspect facilitates production of the porous layer satisfying the water-vapor permeability described above.

(4) In the manufacturing method of the above aspect, the water-repellent resin powder may include polytetrafluoroethylene (PTFE) powder. This aspect facilitates production of the porous layer satisfying the water-vapor permeability described above.

(5) According to another aspect of the invention, there is provided a porous layer stacked between a catalyst layer and a gas diffusion layer in a membrane electrode assembly of a fuel cell. Water-vapor permeability of the porous layer measured in conformity with the Japanese Industrial Standard JIS-Z-0208 may be 10000 to 25000 g/m$^2$·24 h under conditions of temperature of 40° C. and relative humidity of 90% RH. According to this aspect, the porous layer improves the power generation performance of the resulting fuel cell.

(6) The porous layer of the above aspect may be produced from a powdery substance that is obtained by drying a mixed solution containing conductive carbon powder and water-repellent resin powder by a spray-drying method. The porous layer of this aspect further improves the power generation performance of the resulting fuel cell.

The invention may be implemented by any of various aspects other than the porous layer and the manufacturing method of the same, for example, a membrane electrode assembly including the porous layer described above, a fuel cell including such a membrane electrode assembly and manufacturing methods of the membrane electrode assembly and the fuel cell.

BRIEF DESCRIPTION OF DRAWINGS

FIG. 7 is a table showing results of an evaluation test of porous layers.

DESCRIPTION OF EMBODIMENTS

A. Embodiment

A-1. Manufacturing Method of Porous Layer

Figure 1:
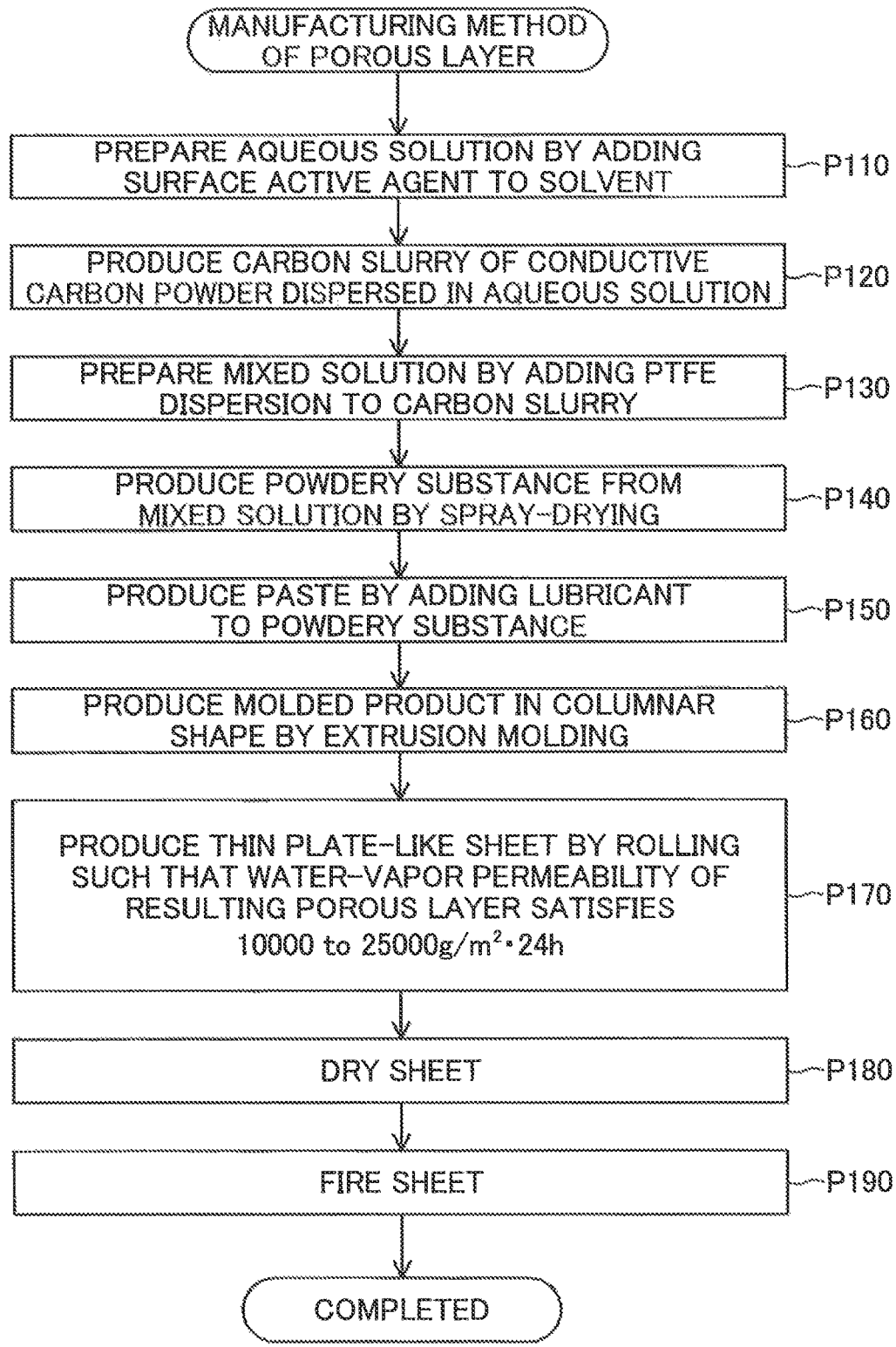
FIG. 1 is a flowchart showing a manufacturing method of a porous layer.

FIG. 1 is a flowchart showing a manufacturing method of a porous layer. The porous layer is a layer comprised of continuous micro pores and is also called microporous layer (MPL). The porous layer is stacked between a catalyst layer and a gas diffusion layer in a membrane electrode assembly (MEA) used for a polymer electrolyte fuel cell.

In the method of manufacturing the porous layer, the manufacturer first prepares an aqueous solution by adding a surface active agent to a solvent (process P110). According to this embodiment, the solvent is pure water (for example, deionized water or distilled water). The surface active agent is preferably a nonionic surface active agent insusceptible to pH and is Triton X according to this embodiment. According to this embodiment, the manufacturer sufficiently stirs the solvent containing a certain amount of the surface active agent added to provide a concentration of 10% by mass, with a stirrer for 10 minutes at a rotation speed that does not produce bubbles.

After preparing the aqueous solution containing the surface active agent (process P110), the manufacturer produces a carbon slurry that is a mixture of conductive carbon powder dispersed in the aqueous solution (process P120). According to this embodiment, the conductive carbon powder is acetylene black ("HS-100" manufactured by DENKI KAGAKU KOGYO KABUSHIKI KAISHA). The conductive carbon powder is preferably acetylene black, Vulcan XC or Ketjen black and may be furnace black, thermal black or graphite. The conductive carbon powder may be a single powder or a mixture of two or more powders.

According to this embodiment, the manufacturer adds 100 g (grams) of the conductive carbon powder to 1000 cc (cm$^3$) of the aqueous solution. According to this embodiment, the manufacturer stirs the aqueous solution including the added conductive carbon powder using a mixer (planetary mixture manufactured by PRIMIX Corporation), so as to produce a carbon slurry of the conductive carbon powder dispersed in the aqueous solution. In order to obtain a homogeneous carbon slurry, the stirring time with the mixture is preferably 1 to 3 hours. According to this embodiment, the manufacturer processes the carbon slurry by vacuum degassing process as appropriate.

After producing the carbon slurry (process P120), the manufacturer prepares a mixed solution containing the conductive carbon powder and water-repellent resin powder from the carbon slurry (process P130). According to this embodiment, the water-repellent resin powder is polytetrafluoroethylene (PTFE) powder. According to another embodiment, the water-repellent resin powder may be powder of another water-repellent resin such as PFA resin or ETFE resin.

According to this embodiment, the manufacturer adds a PTFE dispersion ("D-1E" manufactured by Daikin Industries, Ltd.) to the carbon slurry. According to this embodiment, the manufacturer stirs the carbon slurry including the added PTFE dispersion using a mixer (planetary mixture manufactured by PRIMIX Corporation) for 10 minutes, so as to prepare a mixed solution containing the conductive carbon powder and the water-repellent resin powder. According to this embodiment, the mass ratio of the conductive carbon powder to the PTFE powder included in the mixed solution is 60 to 40.

After preparing the mixed solution (process P130), the manufacturer dries the mixed solution containing the conductive carbon powder and the water-repellent resin powder by spray-drying method, so as to produce a powdery substance including the conductive carbon powder coated with the water-repellent resin powder (process P140). According to this embodiment, the manufacturer produces a powdery substance from the mixed solution using a spray dryer (manufactured by Fujisaki Electric Co., Ltd.) under the conditions of the hot air temperature of 200° C. and the drop rate of the mixed solution of 50 cc/minute. According to this embodiment, the powdery substance obtained from the mixed solution includes the conductive carbon powder coated with the PTFE powder. According to this embodiment, the average particle size of the powdery substance is 3 to 5 μm (micrometers).

After producing the powdery substance by the spray-drying method (process P140), the manufacturer produces a paste from the powdery substance (process P150). According to this embodiment, the paste produced from the powdery substance is a mixture of the powdery substance and a lubricant. According to this embodiment, the lubricant mixed with the powdery substance is "Isopar M" manufactured by ExxonMobil Chemical ("Isopar" is registered trademark). According to this embodiment, the manufacturer mixes the powdery substance including a certain amount of the lubricant added to provide a concentration of 40% by pass using a mixer (pot mill) for one hour and leaves the mixture at room temperature for 8 hours, so as to obtain a paste.

After producing the paste (process P150), the manufacturer produces a molded product in a columnar shape by extrusion molding of the paste (process P160). According to this embodiment, the manufacturer produces a molded product from the paste using a ram extruder (manufactured by TABATA Industrial Machinery Co., Ltd.) The diameter of the molded product is preferably 5 to 20 mm (millimeters) and is 10 mm (millimeters) according to this embodiment. The temperature of a cylinder for extruding the paste is preferably temperature higher than room temperature by 30° C. or more and is temperature higher than room temperature by 70° C. according to this embodiment. The extrusion rate of the paste is preferably 1 to 20 mm/minute and is 5 mm/minute according to this embodiment.

After producing the molded product from the paste (process P160), the manufacturer rolls the molded product in the columnar shape to produce a thin plate-like sheet (process P170). The manufacturer produces a sheet, such that a resulting porous layer produced from the sheet has water-vapor permeability, which is measured in conformity with the Japanese Industrial Standard JIS-Z-0208, of 10000 to 25000 $g/m^2 \cdot 24$ h under the conditions of the temperature of 40° C. and the relative humidity of 90% RH. According to this embodiment, the manufacturer produces the sheet such that the resulting porous layer produced from the sheet has thickness of 50 to 150 µm.

According to this embodiment, the manufacturer produces the sheet by rolling the molded product in the columnar shape using a rolling machine. According to this embodiment, the roll temperature of the rolling machine is 50° C. According to this embodiment, the feed rate of rolling is 0.5 m (meters) per minute.

After producing the sheet (process P170), the manufacturer dries the sheet (process P180). This process removes the lubricant from the sheet. According to this embodiment, the manufacturer dries the sheet in a drying furnace at 150° C. for 1 hour.

After drying the sheet (process P180), the manufacturer fires the sheet (process P190). This process removes the surface active agent and completes the porous layer. According to this embodiment, the manufacturer fires the sheet in a firing furnace at 350° C. for 10 minutes. According to another embodiment, the manufacturer may omit the process of drying the sheet (process P180) and remove the lubricant as well as the surface active agent in the process of firing the sheet (process P190).

With regard to the porous layer produced through this series of processes, the water-vapor permeability measured in conformity with the Japanese Industrial Standard JIS-Z-0208 satisfies 10000 to 25000 $g/m^2 \cdot 24$ h under the conditions of the temperature of 40° C. and the relative humidity of 90% RH. According to this embodiment, the thickness of the porous layer is 50 to 150 µm.

A-2. Manufacturing Method of Membrane Electrode Assembly (MEA)

Figure 2:
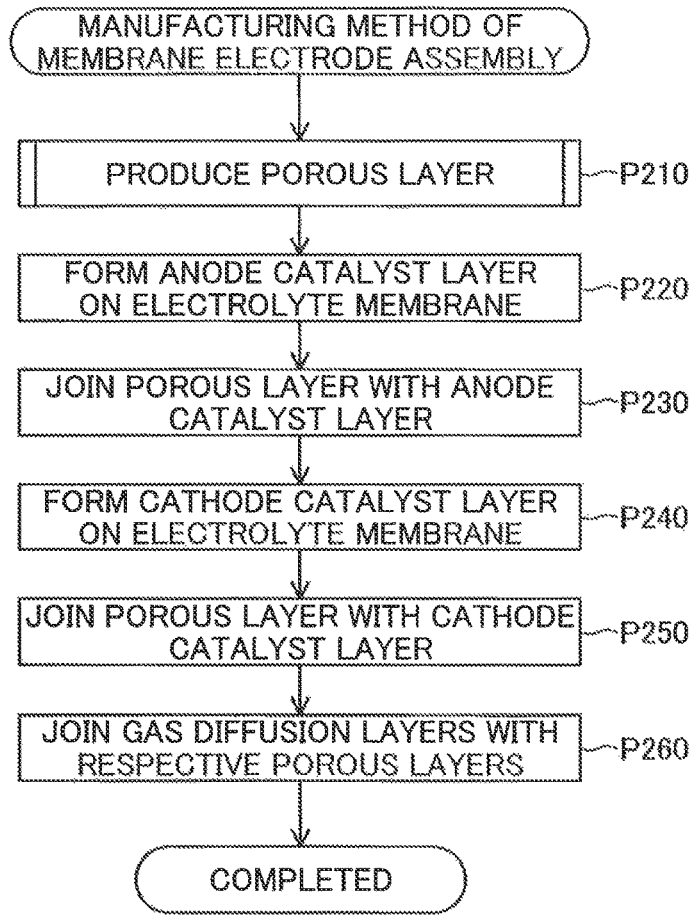
FIG. 2 is a flowchart showing a manufacturing method of an MEA.

FIG. 2 is a flowchart showing a manufacturing method of the MEA. FIGS. 3, 4, 5 and 6 are diagrams illustrating processes of manufacturing the MEA. According to this embodiment, the manufacturer simultaneously performs a plurality of processes of manufacturing the MEA. According to another embodiment, the manufacturer may sequentially perform at least part of a plurality of processes of manufacturing the MEA. In the manufacturing method of the MEA, the manufacturer produces in advance the porous layer by the manufacturing method described above (process P210).

Figure 3:
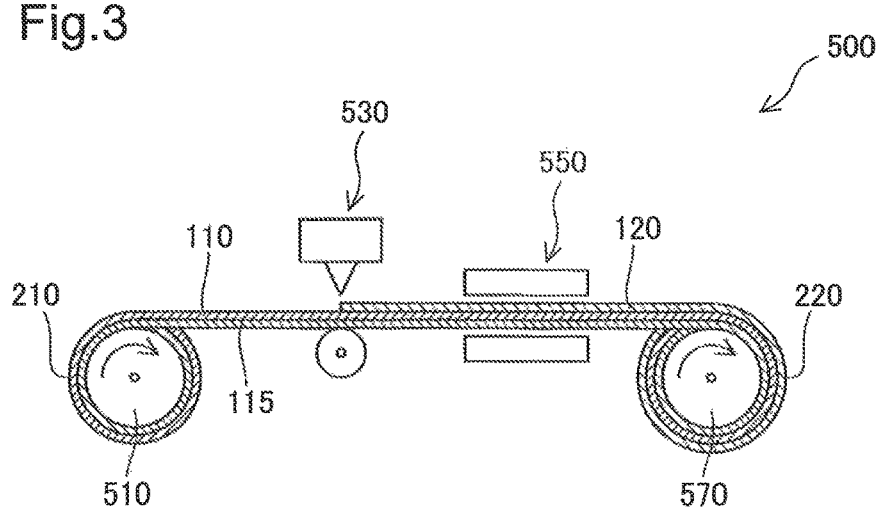
FIG. 3 is a diagram illustrating a process of manufacturing the MEA.

After producing the porous layer (process P210), the manufacturer forms an anode catalyst layer 120 on an electrolyte membrane 110 (process P220). As shown in FIG. 3, according to this embodiment, the electrolyte membrane 110 is formed on a thin plate-like carrier film 115 that is provided to reinforce the electrolyte membrane 110 in a conveyable manner. According to this embodiment, the manufacturer provides a roll 210 which the electrolyte membrane 110 is wound on, along with the carrier film 115.

According to this embodiment, the manufacturer uses a manufacturing apparatus 500 to form the anode catalyst layer 120 on the electrolyte membrane 110. The manufacturing apparatus 500 includes a drawing mechanism 510, an ejecting mechanism 530, a dryer 550 and a winding mechanism 570.

The drawing mechanism 510 of the manufacturing apparatus 500 draws the electrolyte membrane 110 along with the carrier film 115 from the roll 210. The ejecting mechanism 530 of the manufacturing apparatus 500 applies ink containing a material of the catalyst layer (catalyst-supported carbon) onto the electrolyte membrane 110 drawn from the roll 210. The dryer 550 of the manufacturing apparatus 500 dries the ink applied on the electrolyte membrane 110. This process forms the anode catalyst layer 120 on the electrolyte membrane 110. The winding mechanism 570 of the manufacturing apparatus 500 winds up the electrolyte membrane 110 with the anode catalyst layer 120 formed thereof, along with the carrier film 115. This process forms a roll 220.

Figure 4:
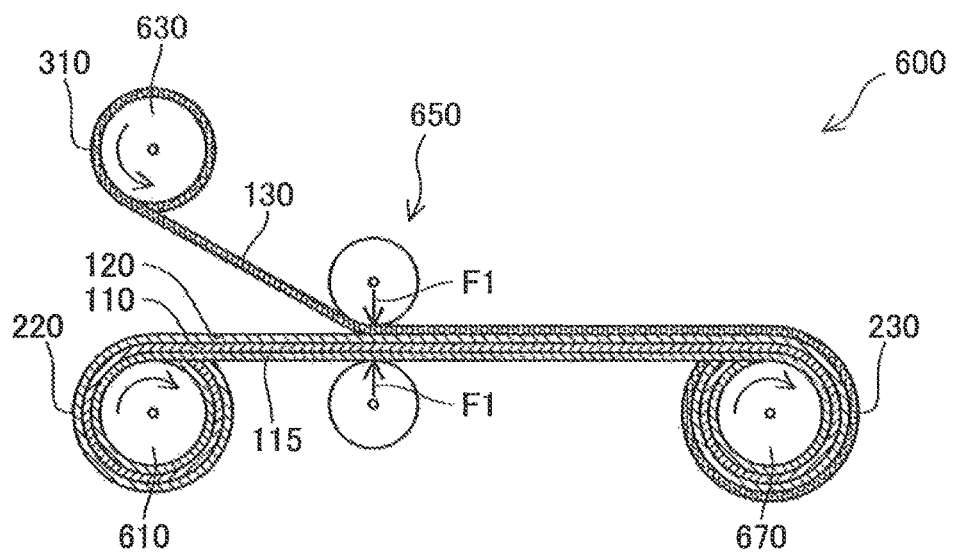
FIG. 4 is a diagram illustrating a process of manufacturing the MEA.
Figure 5:
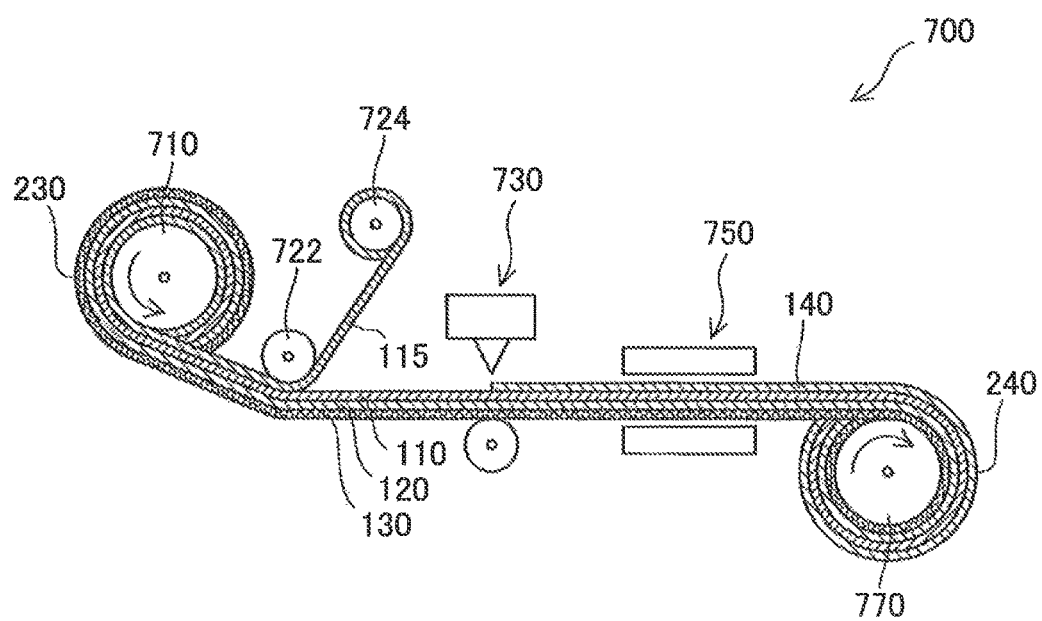
FIG. 5 is a diagram illustrating a process of manufacturing the MEA.

Referring back to FIG. 2, after forming the anode catalyst layer 120 on the electrolyte membrane 110 (process P220), the manufacturer joins a porous layer 130 with the anode catalyst layer 120 (process P230). As shown in FIG. 4, according to this embodiment, the manufacturer provides the roll 220 formed by the process P220 and a roll 310 which the porous layer 130 produced by the process P210 is wound on.

According to this embodiment, the manufacturer uses a manufacturing apparatus 600 to join the porous layer 130 with the anode catalyst layer 120. The manufacturing apparatus 600 includes a drawing mechanism 610, another drawing mechanism 630, a roll pressing mechanism 650 and a winding mechanism 670.

The drawing mechanism 610 of the manufacturing apparatus 600 draws the electrolyte membrane 110 with the anode catalyst layer 120 formed thereon, from the roll 220. The drawing mechanism 630 of the manufacturing apparatus 600 draws the porous layer 130 from the roll 310. The roll-pressing mechanism 650 of the manufacturing apparatus 600 stacks the porous layer 130 drawn by the drawing mechanism 630 on the anode catalyst layer 120 drawn along with the electrolyte membrane 110 and the carrier film 115 by the drawing mechanism 610 and hot-roll presses the stacked layers. According to this embodiment, a pressure F1 applied by the roll-pressing mechanism 650 is 3 MPa (megapascals). The winding mechanism 670 of the manufacturing apparatus 600 winds up the electrolyte membrane 110 having the anode catalyst layer 120 joined with the porous layer 130, along with the carrier film 115. This process forms a roll 230.

Referring back to FIG. 2, after joining the porous layer 130 with the anode catalyst layer 120 (process P230), the manufacturer forms a cathode catalyst layer 140 on the electrolyte membrane 110 (process P240). As shown in FIG.

5, according to this embodiment, the manufacturer provides the roll 230 formed by the process P230.

According to this embodiment, the manufacturer uses a manufacturing apparatus 700 to form the cathode catalyst layer 140 on the electrolyte membrane 110. The manufacturing apparatus 700 includes a drawing mechanism 710, a detaching mechanism 722, a winding mechanism 724, an ejecting mechanism 730, a dryer 750 and a winding mechanism 770.

The drawing mechanism 710 of the manufacturing apparatus 700 draws the electrolyte membrane 110 having the anode catalyst layer 120 joined with the porous layer 130, along with the carrier film 115, from the roll 230. The detaching mechanism 722 of the manufacturing apparatus 700 detaches the carrier film 115 from the electrolyte membrane 110 drawn from the roll 230 by the drawing mechanism 710. The winding mechanism 724 of the manufacturing apparatus 700 collects the carrier film 115 detached by the detaching mechanism 722.

The ejecting mechanism 730 of the manufacturing apparatus 700 applies ink containing a material of the catalyst layer (catalyst-supported carbon) on a surface of the electrolyte membrane 110 from which the carrier film 115 is detached. The dryer 750 of the manufacturing apparatus 700 dries the ink applied on the electrolyte membrane 110. This process forms the cathode catalyst layer 140 on the electrolyte membrane 110. The winding mechanism 770 of the manufacturing apparatus 700 winds up the electrolyte membrane 110 with the cathode catalyst 140 formed thereon, in addition to the anode catalyst layer 120 and the porous layer 130. This process forms a roll 240.

Figure 6:
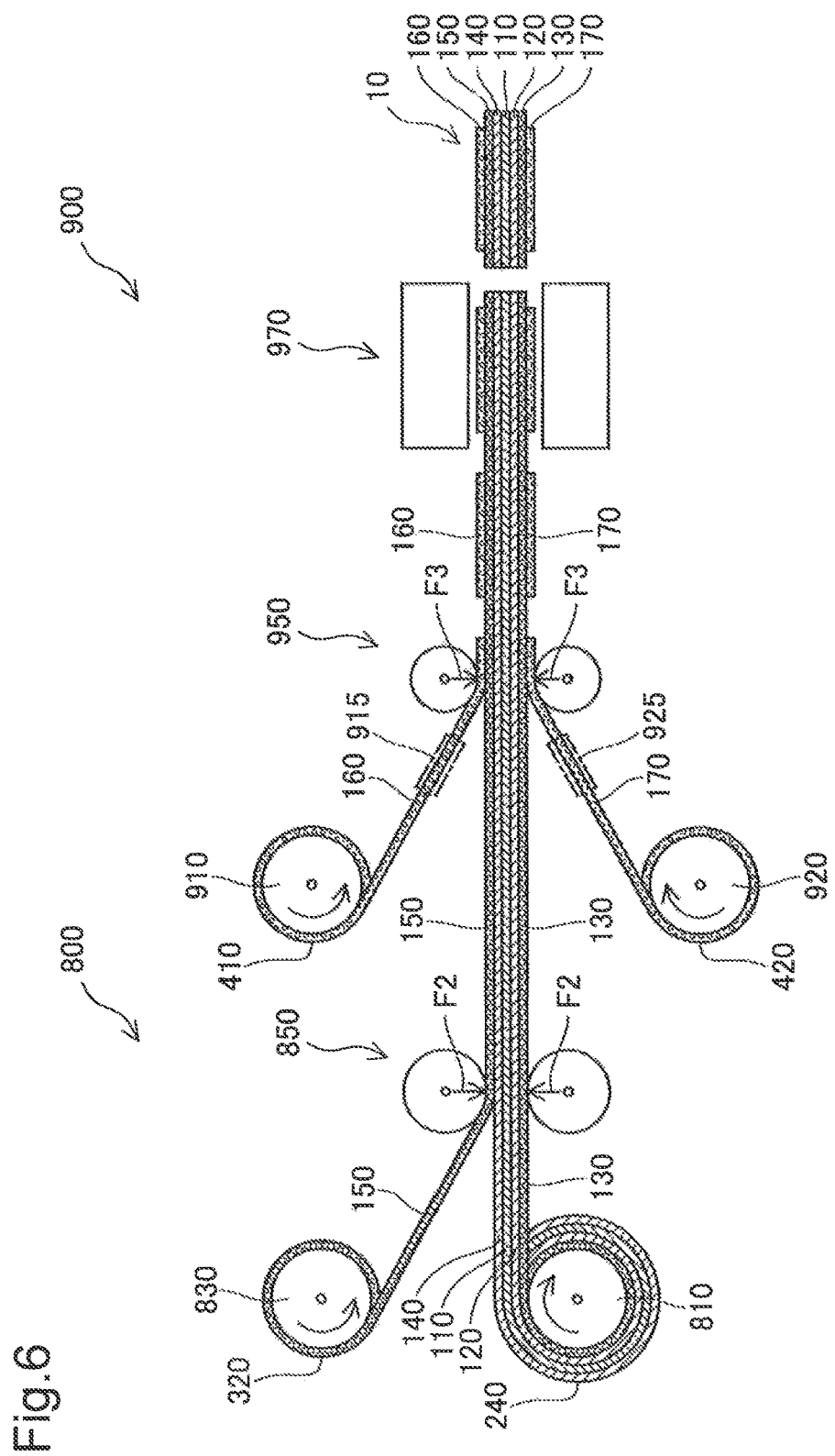
FIG. 6 is a diagram illustrating a process of manufacturing the MEA.

Referring back to FIG. 2, after forming the cathode catalyst layer 140 on the electrolyte membrane 110 (process P240), the manufacturer joins a porous layer 150 with the cathode catalyst layer 140 (process P250). As shown in FIG. 6, according to this embodiment, the manufacturer provides the roll 240 formed by the process P240 and a roll 320 which the porous layer 150 produced by the process P210 is wound on.

According to this embodiment, the manufacturer uses a manufacturing apparatus to join a porous layer 150 with the cathode catalyst layer 140. The manufacturing apparatus 800 includes a drawing mechanism 810, another drawing mechanism 830 and a roll-pressing mechanism 850.

The drawing mechanism 810 of the manufacturing apparatus 800 draws the electrolyte membrane 110 with the cathode catalyst layer 140 formed thereon, from the roll 240. The drawing mechanism 830 of the manufacturing apparatus 800 draws the porous layer 150 from the roll 320. The roll-pressing mechanism 850 of the manufacturing apparatus 800 stacks the porous layer 150 drawn by the drawing mechanism 830 on the cathode catalyst layer 140 drawn along with the electrolyte membrane 110, the anode catalyst layer 120 and the porous layer 130 by the drawing mechanism 810 and hot-roll presses the stacked layers. This process joins the porous layer 150 with the cathode catalyst layer 140. According to this embodiment, a pressure F2 applied by the roll-pressing mechanism 850 is 3 MPa.

Referring back to FIG. 2, after joining the porous layer 150 with the cathode catalyst layer 140 (process P250), the manufacturer joins a gas diffusion layer 160 with the porous layer 150, while joining a gas diffusion layer 170 with the porous layer 130 (process P260). According to this embodiment, the manufacturer sequentially performs the process of joining the porous layer 150 (process P250) and the process of joining the gas diffusion layers 160 and 170 (process P260).

According to this embodiment, the manufacturer provides a roll 410 which the gas diffusion layer 160 is wound on and a roll 420 which the gas diffusion layer 170 is wound on. According to this embodiment, the gas diffusion layers 160 and 170 are made of polyacrylonitrile (PAN)-based carbon fiber. According to another embodiment, the gas diffusion layers 160 and 170 may be made of another carbon fiber such as pitch-based carbon fiber, cellulose-based carbon fiber or polynosic-based carbon fiber.

According to this embodiment, the manufacturer uses a manufacturing apparatus 900 to join the gas diffusion layers 160 and 170 (process P260). The manufacturing apparatus 900 includes a drawing mechanism 910, a cutting mechanism 915, a drawing mechanism 920, a cutting mechanism 925, a roll-pressing mechanism 950 and a hot-pressing mechanism 970.

The drawing mechanism 910 of the manufacturing apparatus 900 draws the gas diffusion layer 160 from the roll 410. The cutting mechanism 915 of the manufacturing apparatus 900 cuts the gas diffusion layer 160 drawn by the drawing mechanism 910 into a desired length. The drawing mechanism 920 of the manufacturing apparatus 900 draws the gas diffusion layer 170 from the roll 420. The cutting mechanism 925 of the manufacturing apparatus 900 cuts the gas diffusion layer 170 drawn by the drawing mechanism 920 into a desired length.

The roll-pressing mechanism 950 of the manufacturing apparatus 900 places the electrolyte membrane 110 joined with the porous layers 130 and 150 between the gas diffusion layer 160 drawn by the drawing mechanism 910 and the gas diffusion layer 170 drawn by the drawing mechanism 920 and hot-roll presses the stacked layers. This process joins the gas diffusion layer 160 with the porous layer 150, while joining the gas diffusion layer 170 with the porous layer 130. A pressure F3 applied by the roll-pressing mechanism 950 is lower than the pressure F1 applied by the roll-pressing mechanism 650 and the pressure F2 applied by the roll-pressing mechanism 850. According to this embodiment, the pressure F3 applied by the roll pressing mechanism 950 is 1 MPa. This suppresses the gas diffusion layers 160 and 170 from being stuck into the electrolyte membrane 110.

The hot-pressing mechanism 970 of the manufacturing apparatus 900 hot-presses the electrolyte membrane 110 joined with the gas diffusion layers 160 and 170. This process completes a membrane electrode assembly (MEA) 10.

A-3. Evaluation Test

FIG. 7 is a table showing results of an evaluation test of porous layers. In the evaluation test of FIG. 7, the examiner produced a plurality of porous layers as samples and measured the water-vapor permeability of the respective porous layers. The examiner subsequently produced fuel cells from MEAs using the respective porous layers and evaluated the power generation performances of the respective fuel cells.

Samples A1 to A6 are porous layers produced by the manufacturing method of the porous layer shown in FIG. 1. The thicknesses of the respective samples were 20 μm, 50 μm, 80 μm, 100 μm, 150 μm and 320 μm.

A sample B is a porous layer produced from a sediment by a centrifugal separator. In production of the example B, the examiner centrifuged the mixed solution obtained at the above process P130 by a centrifugal separator to obtain a sediment. After obtaining the sediment, the examiner dried the sediment in a drying furnace at 150° C. to obtain a powdery substance. The powdery substance obtained from the sediment includes conductive carbon powder coated with PTFE powder. The average particle size of the powdery substance was 4 to 7 μm. After obtaining the powdery substance, the examiner produced a porous layer as the sample B through the same series of processes as the above process P150 and subsequent processes. The thickness of the sample B was 80 μm.

A sample C is a porous layer produced from a powdery substance as a mixture of conductive carbon powder and PTFE powder. In production of the sample C, the examiner mixed acetylene black ("HS-100" manufactured by DENKI KAGAKU KOGYO KABUSHIKI KAISHA) with PTFE powder ("M-111" manufactured by Daikin Industries, Ltd., average particle size of 30 μm) for 30 minutes using a mixer (V blender) to obtain a powdery substance. The mass ratio of acetylene black to PTFE powder in the powdery substance was 60 to 40. After obtaining the powdery substance, the examiner produced a porous layer as the sample C through the same series of processes as the above process P150 and subsequent processes. The thickness of the sample C was 80 μm.

A sample D is a porous layer applied on a gas diffusion layer. In production of the sample D, the examiner applied the mixed solution obtained by the above process P130 on carbon paper as a gas diffusion layer. The examiner dried the mixed solution applied on the carbon paper in a drying furnace at 150° C. and subsequently fired the mixed solution on the carbon paper in a firing furnace at 350° C., so as to produce a porous layer as the sample D. When the composition of the mixed solution used for production of the sample D was identical with the composition of the samples A1 to A6, a resulting fuel cell produced using the sample D has extremely deteriorating power generation performance. Accordingly, the examiner set the mass ratio of the conductive carbon powder to the PTFE powder included in the mixed solution used for production of the sample D to 80 to 20. The thickness of the sample D was 50 μm.

With regard to the respective samples other than the sample D formed on carbon paper, i.e., the samples A1 to A6, B and C, the examiner measured the water-vapor permeability by a measurement method in conformity with the Japanese Industrial Standard JIS-Z-0208 (cup method). The examiner exposed a test piece of each sample (60 mm in diameter) to a container including a moisture adsorbent (anhydrous calcium chloride) and measured the amount of moisture adsorbed by the moisture adsorbent for 24 hours under the conditions of the temperature of 40° C. and the relative humidity of 90% RH, as the water-vapor permeability of each sample.

The examiner produced fuel cells from MEAs using the respective samples and measured the voltages of the fuel cells at different fuel cell temperatures as the power generation performances of the respective fuel cells. The examiner adjusted the fuel cell temperature to 80° C. suitable for power generation and measured the voltage at the current density of 1.0 A/cm$^2$ under the condition of the relative humidity of 90% RH of fuel gas and oxidizing gas. The examiner subsequently decreased the fuel cell temperature to 50° C. simulating the start-time temperature and similarly measured the voltage.

The examiner evaluated the power generation performances based on the following evaluation criteria:

double circle: the voltage equal to or higher than 650 mV at the battery temperature of 80° C. and the voltage equal to or higher than 560 mV at the battery temperature of 50° C.;

circle: the voltage equal to or higher than 630 mV at the battery temperature of 80° C. and the voltage equal to or higher than 320 mV at the battery temperature of 50° C.;

cross mark: the voltage of lower than 630 mV at the battery temperature of 80° C. or the voltage of lower than 320 mV at the battery temperature of 50°.

According to the results of the evaluation test of FIG. 7, controlling the water-vapor permeability of the porous layer produced from the powdery substance obtained by the spray-drying method to 12000 to 24000 g/m$^2$·24 h improves the power generation performance of the fuel cell. The thickness of the porous layer that satisfies the water-vapor permeability of 12000 to 24000 g/m$^2$·24 h is 50 to 150 μm. According to the variations of the voltage value from the sample A2 to the sample A5, the comparison between the sample A1 and the sample A2 and the comparison between the sample A5 and the sample A6, the water-vapor permeability in at least the range of 10000 to 25000 g/m$^2$·24 h is expected to improve the power generation performance of the fuel cell.

A-4. Advantageous Effects

The manufacturing method of the porous layer according to the embodiment described above enables the PTFE powder and the conductive carbon powder to be homogeneously dispersed in the powdery substance, thus enhancing the homogeneity of the porous layer. This results in providing a porous layer that allows for improvement of the power generation performance of the resulting fuel cell.

Compared with the method of producing a porous layer from a coprecipitate, this manufacturing method obtains the powdery substance in which the PTFE powder and the conductive carbon powder are dispersed homogeneously, in a shorter time. This results in enhancing the productivity of the porous layer.

Controlling the thickness of the porous layer to 50 to 150 μm facilitates production of the porous layer satisfying the water-vapor permeability described above. The porous layer is produced by firing the sheet molded from the paste that is obtained from the powdery substance (processes P150 to P190). This facilitates production of the porous layer satisfying the water-vapor permeability described above.

B. Other Embodiments

The invention is not limited to any of the embodiment, the examples and the modifications described above but may be implemented by a diversity of other configurations without departing from the scope of the invention. For example, the technical features of the embodiment, examples and modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 110 electrolyte membrane
115 carrier film
120 anode catalyst layer
130 porous layer
140 cathode catalyst layer
150 porous layer
160 gas diffusion layer
170 gas diffusion layer
210 roll
220 roll
230 roll
240 roll
310 roll 320 roll
410 roll
420 roll
500 manufacturing apparatus
510 drawing mechanism
530 ejecting mechanism
550 dryer
570 winding mechanism
600 manufacturing apparatus
610 drawing mechanism
630 drawing mechanism
650 roll-pressing mechanism
670 winding mechanism
700 manufacturing apparatus
710 drawing mechanism
722 detaching mechanism
724 winding mechanism
730 ejecting mechanism
750 dryer
770 winding mechanism
800 manufacturing apparatus
810 drawing mechanism
830 drawing mechanism
850 roll-pressing mechanism
900 manufacturing apparatus
910 drawing mechanism
915 cutting mechanism
920 drawing mechanism
925 cutting mechanism
950 roll-pressing mechanism
970 hot-pressing mechanism

What is claimed is:

1. A manufacturing method of a porous layer, the porous layer being stacked between a catalyst layer and a gas diffusion layer in a membrane electrode assembly of a fuel cell, the manufacturing method comprising:
   (a) process of drying a mixed solution containing conductive carbon powder and water-repellent resin powder by a spray-drying method, so as to produce a powdery substance including the conductive carbon powder coated with the water-repellent resin powder, wherein an average particle size of the powdery substance obtained by the spray drying method ranges from 3 to 5 μm; and
   (b) process of preparing a paste from the powdery substance produced by the process (a),
   (c) process of molding the paste to a thin plate-like sheet,
   (d) process of firing the sheet to produce the porous layer, and
   (e) process of stacking the porous layer between the catalyst layer and the gas diffusion layer, wherein water-vapor permeability of the porous layer is 10000 to 25000 g/m$^2$·24 h under conditions of temperature of 40° C. and relative humidity of 90%.

2. A manufacturing method of a porous layer, the porous layer being stacked between a catalyst layer and a gas diffusion layer in a membrane electrode assembly of a fuel cell, the manufacturing method comprising:
   (a) process of drying a mixed solution containing conductive carbon powder and water-repellent resin powder by a spray-drying method, so as to produce a powdery substance including the conductive carbon powder coated with the water-repellent resin powder, wherein an average particle size of the powdery substance obtained by the spray drying method ranges from 3 to 5 μm; and
   (b) process of preparing a paste from the powdery substance produced by the process (a);
   (c) process of molding the paste to a thin plate-like sheet;
   (d) process of firing the sheet to produce the porous layer; and
   (e) process of stacking the porous layer between the catalyst layer and the gas diffusion layer, wherein the process (c) controls a thickness of the porous layer to 50 to 150 μm such that water-vapor permeability of the porous layer is 10000 to 25000 g/m$^2$·24 h under conditions of temperature of 40° C. and relative humidity of 90%.

3. The manufacturing method of porous layer according to claim 1, wherein the water-repellent resin powder includes polytetrafluoroethylene (PTFE) powder.

\* \* \* \* \*